United States Patent
Yang et al.

(10) Patent No.: US 9,640,789 B2
(45) Date of Patent: May 2, 2017

(54) CONNECTING ELEMENT FOR SECONDARY BATTERY AND SECONDARY BATTERY COMPRISING THE SAME

(71) Applicant: LG Chem, Ltd., Seoul (KR)

(72) Inventors: Jung-Hoon Yang, Daejeon (KR);
Jong-Hun Kim, Daejeon (KR);
Young-Suk Cho, Daejeon (KR);
Jeong-Gyu Park, Daejeon (KR);
Hyun-Gyu Han, Daejeon (KR)

(73) Assignee: LG Chem, Ltd. (KR)

( * ) Notice: Subject to any disclaimer, the term of this patent is extended or adjusted under 35 U.S.C. 154(b) by 152 days.

(21) Appl. No.: 14/499,647

(22) Filed: Sep. 29, 2014

(65) Prior Publication Data

US 2015/0017507 A1    Jan. 15, 2015

Related U.S. Application Data

(63) Continuation of application No. PCT/KR2014/004159, filed on May 9, 2014.

(30) Foreign Application Priority Data

May 20, 2013    (KR) ........................ 10-2013-0056540

(51) Int. Cl.
*H01M 2/20*    (2006.01)
*H01M 10/0525*    (2010.01)
(Continued)

(52) U.S. Cl.
CPC ........... *H01M 2/204* (2013.01); *H01M 2/206* (2013.01); *H01M 2/34* (2013.01); *H01H 37/761* (2013.01);
(Continued)

(58) Field of Classification Search
CPC ........ H01M 2/20; H01M 2/204; H01M 2/206; H01M 10/0525
See application file for complete search history.

(56) References Cited

U.S. PATENT DOCUMENTS

| 5,898,357 A | 4/1999 | Endo et al. |
| 2003/0034169 A1 | 2/2003 | Tanaka |

(Continued)

FOREIGN PATENT DOCUMENTS

| JP | 09-153352 A | 6/1997 |
| JP | 2012-527716 A | 11/2012 |

(Continued)

OTHER PUBLICATIONS

Extended Search Report from European Application No. 14800560.6, dated May 20, 2016.

*Primary Examiner* — Patrick Ryan
*Assistant Examiner* — Christopher Domone
(74) *Attorney, Agent, or Firm* — Lerner, David, Littenberg, Krumholz & Mentlik, LLP (57) ABSTRACT

A connecting element for a secondary battery according to the present disclosure includes a metal plate having a recess groove, a soldering pattern having a lower melting point than the metal plate and formed within the recess groove, and an insulation layer formed on at least one surface among both surfaces of the metal plate, and covering an area where the soldering pattern is formed.
According to the present disclosure, it is possible to interrupt an overcurrent quickly when the overcurrent occurs, and prevent secondary damage caused by a spark that may occur when the connecting element for the secondary battery is ruptured.

20 Claims, 12 Drawing Sheets

(51) Int. Cl.
*H01M 2/34* (2006.01)
*H01H 37/76* (2006.01)
*H01H 85/02* (2006.01)
*H01M 2/10* (2006.01)

(52) U.S. Cl.
CPC . *H01H 2037/768* (2013.01); *H01H 2085/025* (2013.01); *H01M 2/1016* (2013.01); *H01M 2/1077* (2013.01); *H01M 2/202* (2013.01); *H01M 2/348* (2013.01); *H01M 10/0525* (2013.01); *H01M 2200/103* (2013.01)

(56) References Cited

U.S. PATENT DOCUMENTS

| | | |
|---|---|---|
| 2009/0189730 A1 | 7/2009 | Oh et al. |
| 2012/0126929 A1 | 5/2012 | Tong et al. |
| 2013/0236752 A1* | 9/2013 | Yang ............... H01M 2/30 429/61 |
| 2013/0344379 A1 | 12/2013 | Yang et al. |

FOREIGN PATENT DOCUMENTS

| | | |
|---|---|---|
| KR | 2012-0139590 A | 12/2012 |
| KR | 2013-0030199 A | 3/2013 |

* cited by examiner

CONNECTING ELEMENT FOR SECONDARY BATTERY AND SECONDARY BATTERY COMPRISING THE SAME

CROSS-REFERENCE TO RELATED APPLICATION

The present application is a continuation of International Application No. PCT/KR2014/004159 filed on May 9, 2014, which claims priority to Korean Patent Application No. 10-2013-0056540 filed in the Republic of Korea on May 20, 2013, the disclosures of which are incorporated herein by reference.

TECHNICAL FIELD

The present disclosure relates to a secondary battery technology, and more particularly, to a connecting element for a secondary battery for improving safety of the secondary battery and a secondary battery comprising the same.

BACKGROUND ART

With the growing use of portable electric products such as video cameras, mobile phones, portable computers, and the like, significance of secondary batteries being mainly used as their energy sources are rapidly increasing.

As opposed to a disposable primary battery, a secondary battery is rechargeable and is being studied very actively in high-tech fields, for example, digital cameras, cellular phones, laptop computer, power tools, electric bikes, electric vehicles, hybrid vehicles, high-capacity energy storage systems, and the like.

Particularly, a lithium secondary battery has a high energy density per unit weight and allows quick charging, when compared to other conventional secondary batteries such as a lead storage battery, a nickel-cadmium battery, a nickel-hydrogen battery, and a nickel-zinc battery, and thus, its use is on an upward trend.

A lithium secondary battery has an operating voltage higher than or equal to 3.6V, and is used as a power source of portable electronic appliances or high output devices such as electric vehicles, hybrid vehicles, power tools, electric bikes, energy storage systems, and uninterruptible power supplies (UPS) by connecting a plurality of batteries in series or in parallel.

A lithium secondary battery has three times higher operating voltage than that of a nickel-cadmium battery or a nickel-metal hydride battery and an excellent characteristic of energy density per unit weight, and thus, is being increasingly used.

A lithium secondary battery may be classified into a lithium ion battery using a liquid electrolyte and a lithium ion polymer battery using a solid polymer electrolyte, based on a type of an electrolyte. Also, a lithium ion polymer battery may be divided into an all-solid-state lithium ion polymer battery containing no electrolyte liquid and a lithium ion polymer battery using a gel polymer electrolyte containing an electrolyte liquid, based on a type of a solid polymer electrolyte.

A lithium ion battery using a liquid electrolyte is generally used in a shape of a cylindrical or prismatic metal can used for a container that is sealed hermetically by welding. A can-shaped secondary battery using a metal can as a container has a fixed shape, which has limitations on design of an electric product using this as a power source and its volume reduction. Accordingly, a pouch-type secondary battery fabricated by putting an electrode assembly and an electrolyte into a pouch casing made from films and forming a seal has been developed and is being used.

However, a lithium secondary battery has a risk of explosion when overheated, so ensuring safety is one of the important tasks. Overheat of a lithium secondary battery occurs by various reasons, and one of them is a flow of overcurrent beyond the limit through a lithium secondary battery. When an overcurrent flows, a lithium secondary battery generates heat by Joule heating and the temperature inside the battery increases. Also, a rapid temperature increase brings about a decomposition reaction of an electrolyte solution and causes a thermal runaway phenomenon, and in the end, results in explosion of the battery. An overcurrent occurs when a rush current is applied to a battery due to insulation breakdown between a cathode and an anode caused by penetration of a pointed metal object through a lithium secondary battery or shrinkage of a separator interposed between the cathode and the anode, or due to an abnormal condition of an external charging circuit or load being connected.

Accordingly, to protect a lithium secondary battery from an abnormal situation such as occurrence of an overcurrent, the battery is used in combination with a protection circuit, and as a protection circuit, a fuse device that irreversibly disconnects a line through which a charging or discharging current flows in the event of an overcurrent is generally used.

Figure 1:
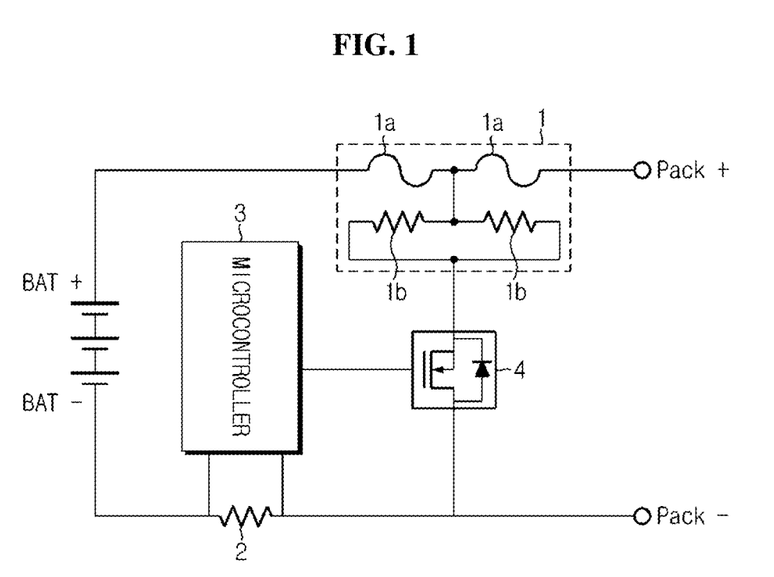
FIG. 1 is a circuit diagram illustrating a layout and an operating mechanism of a fuse device in configuration of a protection circuit connected to a lithium secondary battery.

FIG. 1 is a circuit diagram illustrating a layout and an operating mechanism of a fuse device in configuration of a protection circuit connected to a lithium secondary battery.

As shown in the drawing, the protection circuit includes a fuse device 1 to protect a secondary battery when an overcurrent occurs, a sense resistance 2 to sense an overcurrent, a microcontroller 3 to monitor the occurrence of an overcurrent and operate the fuse device 1 when an overcurrent occurs, and a switch 4 to perform a switching operation to flow an operating current into the fuse device 1.

The fuse device 1 is installed on a main line connected to an outermost terminal of a cell assembly B. The main line represents a wire through which a charging or discharging current flows. In the drawing, the fuse device 1 is illustrated as being installed on a high potential line (Pack+).

The fuse device 1 is a 3-terminal element; two terminals are connected to the main line through which a charging or discharging current flows and the rest is connected to the switch 4. Also, on the inside, the fuse device 1 includes a fuse 1a which is directly connected to the main line and is melted to be ruptured at a particular temperature, and a resistor 1b which applies heat to the fuse 1a.

The microcontroller 3 monitors whether an overcurrent is occurring or not by periodically detecting the voltage across both ends of the sense resistor 2, and when an occurrence of an overcurrent is detected, turns on the switch 4. Then, the electric current flowing through the main line is bypassed to flow toward the fuse device 1 and applied to the resistor 1b. Thus, Joule heat generated from the resistor 1b is transmitted to the fuse 1a and the temperature of the fuse 1a increases, and when the temperature of the fuse 1a reaches a melting temperature of rupture, the fuse 1a is melted to rupture, as a consequence, the main line is irreversibly disconnected. When the main line is disconnected, the overcurrent does not flow any longer and the problem caused by the overcurrent may be solved.

However, a related art as above has many problems. That is, when a failure occurs in the microcontroller 3, the switch 4 is not turned on even in the situation where an overcurrent occurs. In this case, an electric current does not flow into the resistor 1b of the fuse device 1 and the fuse device 1 does not operate. Also, a separate space for disposing the fuse device 1 within the protection circuit is needed, and a program algorithm for controlling the operation of the fuse device 1 needs to be loaded in the microcontroller 3. Therefore, there are drawbacks of reduced spatial efficiency of the protection circuit and increased load of the microcontroller 3.

DISCLOSURE

Technical Problem

The present disclosure is designed to solve the above problem, and therefore, the present disclosure is directed to providing a new type connecting element for a secondary battery needed to implement a passive type overcurrent shut-off function in the secondary battery itself, separately from an active overcurrent shut-off function of a protection circuit, and a secondary battery comprising the same.

However, the object of the present disclosure is not limited to the above object, and other objects of the present disclosure will become apparent to those skilled in the art from the following description.

Technical Solution

While searching for an approach to improving safety of a lithium secondary battery, the inventors discovered that a safety issue raised by an overcurrent may be resolved without any side effect when inlaying a low melting point soldering material layer into a bus bar, that is, a sort of connecting element applied to a battery module, and forming a ceramic coating layer having an insulating property thereon.

Also, the inventors discovered that such an element having a new structure may be used as a general purpose element which may replace not only a bus bar but also various elements disposed on a current flow path of a secondary battery, that is, connecting elements, and completed the invention.

To achieve the above object, a connecting element for a secondary battery according to the present disclosure includes a metal plate having a recess groove, a soldering pattern having a lower melting point than the metal plate and formed within the recess groove, and an insulation layer formed on at least one surface among both surfaces of the metal plate, and covering an area where the soldering pattern is formed.

The recess groove may be formed along a widthwise direction of the metal plate.

The soldering pattern may be made from a lead-free soldering material containing tin (Sn) and copper (Cu) without lead (Pb).

A content of the tin may be in a range of 65.0 wt % to 99.9 wt %, and a content of the copper may be in a range of 0.01 wt % to 35.0 wt %.

The soldering pattern may be made from the soldering material further including at least one additional metal selected from a group consisting of nickel (Ni), zinc (Zn), and silver (Ag).

A content of the additional metal may be in a range of 0.01 wt % to 20.0 wt %.

The soldering pattern may be made from a soldering material having a melting point from 100° C. to 250° C.

The insulation layer may be formed within the recess groove.

A surface of the metal plate and a surface of the insulation layer may form a same plane.

The insulation layer may be formed outside the recess groove.

A surface of the metal plate and a surface of the soldering pattern may form a same plane.

The insulation layer may cover the surface of the metal plate and the surface of the soldering pattern at the same time.

The insulation layer may be made from at least one material selected from a group consisting of insulating materials including ceramic and reinforced resin.

Meanwhile, to achieve the above object, a battery module according to the present disclosure includes at least one battery cell, a module case receiving the battery cell, an external terminal provided protrusively out of the module case, and a bus bar connecting the battery cell and the external terminal, and the connecting element for the secondary battery is applied as a connecting element installed on a path of an electric current flowing in the battery module.

The connecting element for the secondary battery may be applied as the bus bar.

The battery module may further include a lead terminal connected to the external terminal, and in this case the connecting element for the secondary battery may be applied as the lead terminal.

Also, the above object may be achieved by a battery pack according to the present disclosure, and the battery pack according to the present disclosure is implemented by connecting a plurality of battery modules, each battery module comprising at least one battery cell, a module case receiving the battery cell, an external terminal provided protrusively out of the module case, and a bus bar connecting the battery cell and the external terminal, and the connecting element for the secondary battery is applied as a connecting element installed on a path of an electric current flowing in the battery pack.

The battery pack may further include an interconnecting bar connecting the adjacent battery modules, and in this case, the connecting element for the secondary battery may be applied as the interconnecting bar.

The connecting element for the secondary battery may be applied as the bus bar.

The battery pack may further include a lead terminal connected to the external terminal of the battery pack, and in this case, the connecting element for the secondary battery may be applied as the lead terminal.

Advantageous Effects

According to an aspect of the present disclosure, when an overcurrent flows through a connecting element for a secondary battery, the overcurrent flow may be shut off quickly by rupture of a local heat generating area.

According to another aspect of the present disclosure, the connecting element may have a comparatively small resistance value, high strength, and high ductility while having a quick rupture property through component adjustment of a soldering material layer.

According to still another aspect of the present disclosure, the connecting element equipped with an insulation layer may prevent the occurrence of secondary damage such as a short circuit caused by a spark and the like when ruptured.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, a connecting element 10 for a secondary battery according to an exemplary embodiment of the present disclosure is described with reference to FIGS. 2 through 4.

Figure 2:
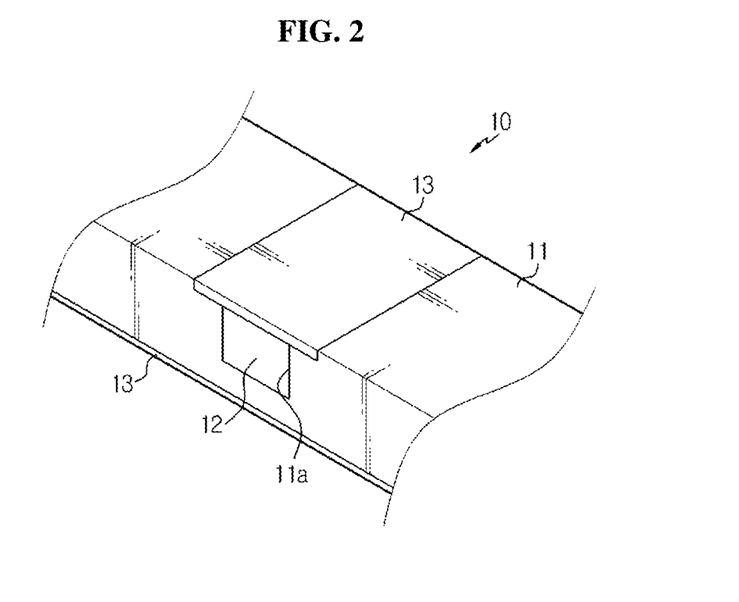
FIG. 2 is a perspective view illustrating a connecting element for a secondary battery according to an exemplary embodiment of the present disclosure.
Figure 3:
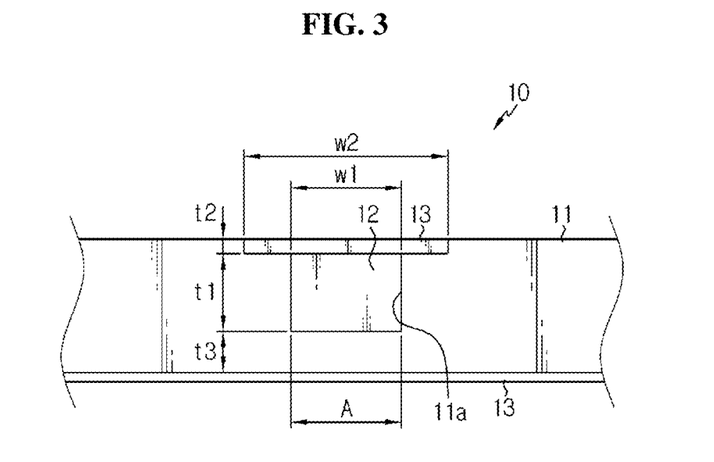
FIG. 3 is a side view illustrating the connecting element for the secondary battery of FIG. 2.
Figure 4:
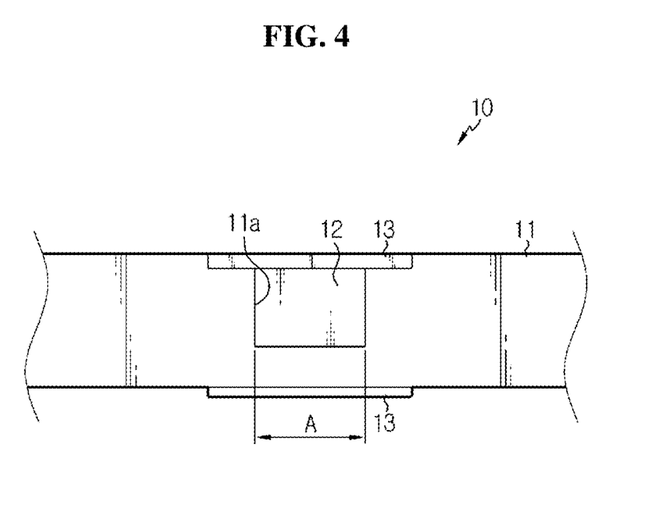
FIG. 4 is a side view illustrating a case in which an insulation layer is formed at a different area in the connecting element for the secondary battery of FIG. 3.

FIG. 2 is a perspective view illustrating a connecting element for a secondary battery according to an exemplary embodiment of the present disclosure, FIG. 3 is a side view illustrating the connecting element for the secondary battery of FIG. 2, and FIG. 4 is a side view illustrating a case in which an insulation layer is formed at a different area in the connecting element for the secondary battery of FIG. 3.

First, referring to FIGS. 2 and 3, the connecting element 10 for the secondary battery according to an exemplary embodiment of the present disclosure includes a metal plate 11, a soldering pattern 12, and an insulation layer 13.

The metal plate 11 is a thin plate-like metal, and includes a recess groove 11a formed at a predetermined depth from a surface along a widthwise direction.

The metal plate 11 is generally made from copper (Cu) or aluminum (Al), but the material for the metal plate 11 of the present disclosure is not limited thereto and various conductive metal materials may be applied.

The material type may change based on a material of a component joined to the metal plate 11. That is, the same material for the metal plate 11 as the material for the component joined thereto may be advantageous in terms of welding performance improvement and contact resistance minimization.

The soldering pattern 12 is made from an alloy having lower conductivity and a lower melting point than the metal plate 11, and is joined within the recess groove 11a formed in the metal plate 11. When an overcurrent flows in the secondary battery due to a short circuit and the like, the soldering pattern 12 melts quickly to form an area A (hereinafter referred to as a local heat generating area) having a small cross sectional area through which an electric current flows, to induce a rupture of the connecting element 10 for the secondary battery.

The alloy for the soldering pattern 12 has a melting point in a range of approximately 100° C. to 250° C., and may include a lead-free alloy containing tin (Sn) and copper (Cu) as a main substance, without lead (Pb) which does harm to the environment and human body.

The melting point range of the alloy for the soldering pattern 12 is set in consideration of a level of an overcurrent intended to interrupt. When the melting point of the alloy is lower than 100° C., the alloy may be melted even when a normal electric current flows through the secondary battery to which the fusing unit 20 is applied. Also, when the melting point of the alloy is higher than 250° C., melting of the alloy is not made quickly and thus an overcurrent is not effectively interrupted.

Among the substances of the alloy, tin affects the melting point and tensile strength characteristics of the alloy. The content of tin is adjusted to approximately 80 wt % or higher, preferably in a range of 85 wt % to 98 wt %, so that the alloy may have good tensile strength characteristics while having a melting point in a range of approximately 100° C. to 250° C. Copper functions to improve electrical conductivity of the alloy, and in consideration of this function, the content of copper is adjusted within a range of approximately 2 wt % to 20 wt %, preferably a range of approximately 4 wt % to 15 wt %. Here, wt % is a unit based on a total weight of the alloy for the soldering pattern 12 and will be hereinafter equally applied.

The insulation layer 13 is formed on at least one surface among both surfaces of the metal plate 11, covers an area where the soldering pattern 12 is formed, namely, the local heat generating area A, and may be made from at least one material selected from a group consisting of insulating materials including ceramic and reinforced resin.

The insulation layer 13 formed on an upper surface of the metal plate 11 may be formed within the recess groove 11a, and in this case, a surface of the metal plate 11 and a surface of the insulation layer 13 may form the same plane.

Further, the insulation layer 13 formed on a lower surface of the metal plate 11 may be formed over the entire lower surface of the metal plate 11 as shown in FIG. 3, but as shown in FIG. 4, may be formed on only a part of the lower surface of the metal plate 13. However, even in this case, the insulation layer 13 is preferably formed to cover the local heat generating area A.

As described above, the insulation layer 13 is formed on at least one surface of the upper surface and the lower surface of the metal plate 11 and covers the local heat generating area A, and may prevent secondary damage caused by a spark that may occur when the connecting element 10 for the secondary battery is ruptured.

That is, when the connecting element 10 for the secondary battery is ruptured with the local heat generating area A as the center, a spark may occur, and due to such a spark, a peripheral component may be damaged, and when a melted alloy material splashes to a peripheral component together with the spark, there is a short circuit risk.

Accordingly, when the insulation layer 13 has a width w2 larger than a width w1 of the recess groove 11a and the soldering pattern 12, splashing of a spark directly to a peripheral component or splashing of a melted alloy material to a peripheral component may be prevented.

Furthermore, the insulation layer 13 connects a first part and a second part of the metal plate spaced apart from each other along a lengthwise direction with respect to the recess groove 11a (representing a left/right direction based on FIG. 3), thereby improving the mechanical strength of the connecting element 10 for the secondary battery.

As described in the foregoing, the connecting element 10 for the secondary battery according to an exemplary embodiment of the present disclosure has a structure in which the soldering pattern 12 having a first thickness t1 and the insulation layer 13 having a second thickness t2 are inlaid into the metal plate 11, thereby interrupting an overcurrent quickly.

That is, in the local heat generating area A, a thickness t3 of the metal plate 11 is smaller than a thickness of a surrounding area t1+t2+t3, and when the low melting point soldering pattern t2 is melted, heat generation in the metal plate 11 within the local heat generating area A is accelerated and thereby the connecting element 10 for the secondary battery is ruptured, so an overcurrent is interrupted.

Also, the insulation layer 13 covering the local heat generating area A on at least one surface of the metal plate 11 may prevent secondary damage caused by a spark that may occur when the element is ruptured.

As such, by the aid of the connecting element 10 for the secondary battery, an overcurrent may be interrupted quickly and secondary damage that may occur due to rupture may be also prevented, thereby ensuring safety of the secondary battery in use.

Subsequently, a connecting element 20 for a secondary battery according to another exemplary embodiment of the present disclosure is described with reference to FIGS. 5 through 7.

Figure 5:
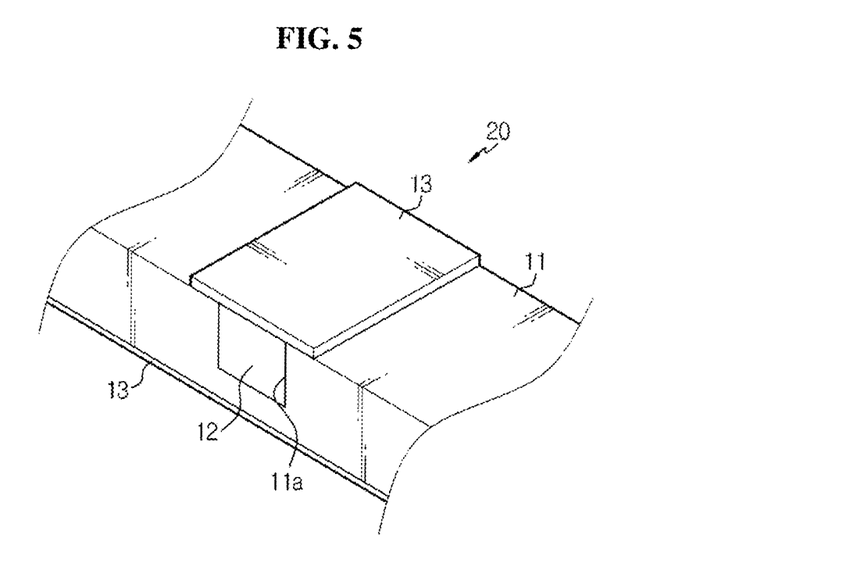
FIG. 5 is a perspective view illustrating a connecting element for a secondary battery according to another exemplary embodiment of the present disclosure.
Figure 6:
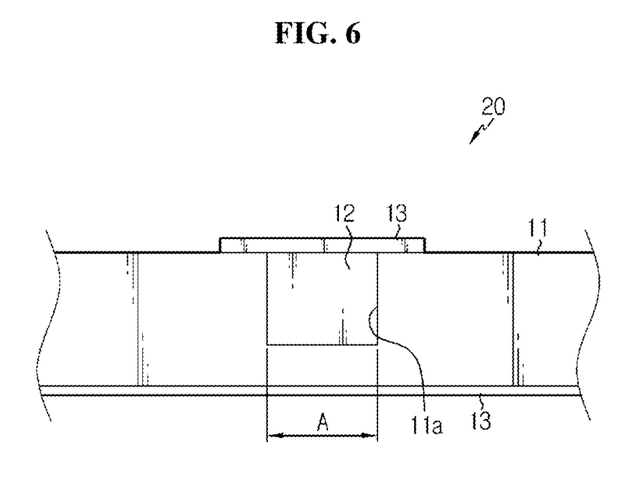
FIG. 6 is a side view illustrating the connecting element for the secondary battery of FIG. 5.
Figure 7:
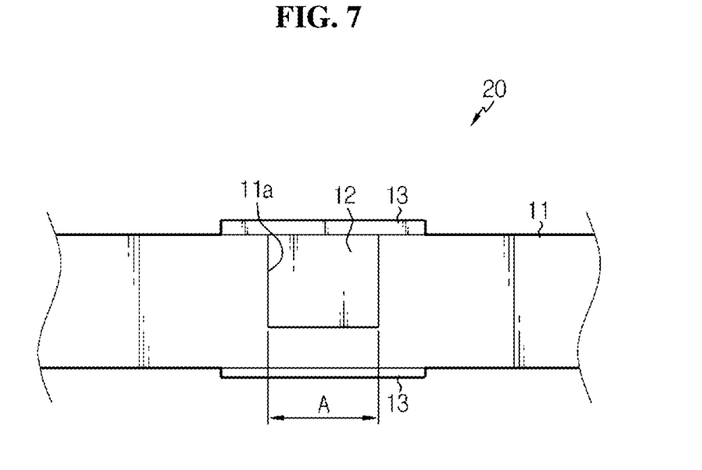
FIG. 7 is a side view illustrating a case in which an insulation layer is formed at a different area in the connecting element for the secondary battery of FIG. 6.

FIG. 5 is a perspective view illustrating a connecting element for a secondary battery according to another exemplary embodiment of the present disclosure, FIG. 6 is a side view illustrating the connecting element for the secondary battery of FIG. 5, and FIG. 7 is a side view illustrating a case in which an insulation layer is formed at a different area in the connecting element for the secondary battery of FIG. 6.

The connecting element 20 for the secondary battery according to another exemplary embodiment of the present disclosure has substantially the same construction as the connecting element 10 for the secondary battery according to the previous embodiment, with the exception of a difference in location where the insulation layer 13 is formed on the upper surface of the metal plate 11.

Accordingly, in the description of the connecting element 20 for the secondary battery according to another exemplary embodiment of the present disclosure, a description of the location where the insulation layer 13 is formed on the upper surface of the metal plate 11 is only provided and an overlapping description with the previous embodiment is omitted herein.

Referring to FIG. 5, and FIG. 7, the insulation layer 13 employed in the connecting element 20 for the secondary battery according to another exemplary embodiment of the present disclosure may be formed outside the recess groove 11a. In this case, the surface of the soldering pattern 12 filled in the recess groove 11a may form the same plane with the surface of the metal plate 11, and the insulation layer 13 may be coated to cover the surfaces of the metal plate 11 and the soldering pattern 12 at the same time.

Excellent effects of the connecting element 20 for the secondary battery according to another exemplary embodiment of the present disclosure are substantially the same as the connecting element 10 of the previous embodiment, and its detailed description is omitted herein.

Subsequently, a battery module M according to an exemplary embodiment of the present disclosure is described with reference to FIGS. 8 and 9.

Figure 8:
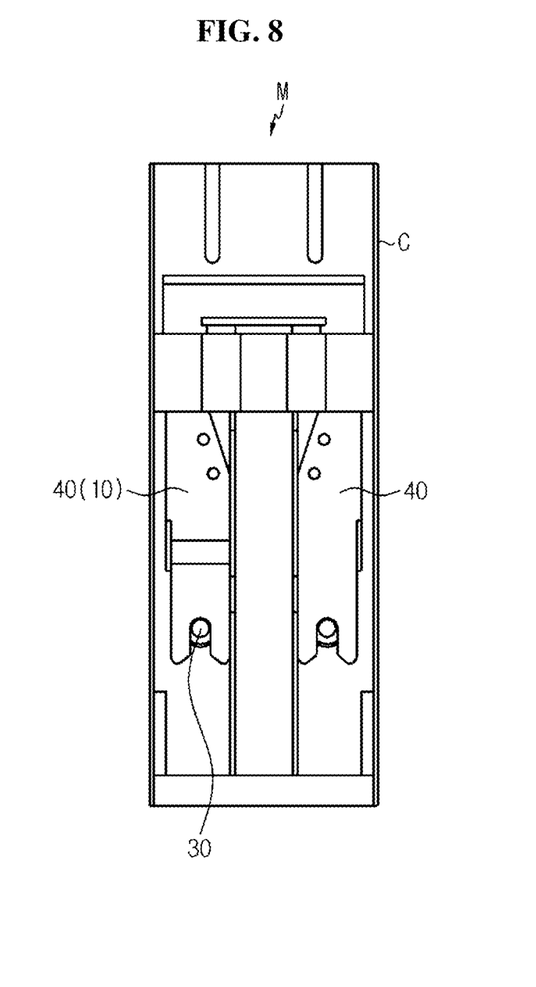
FIGS. 8 and 9 are plane views illustrating a battery module according to an exemplary embodiment of the present disclosure.
Figure 9:
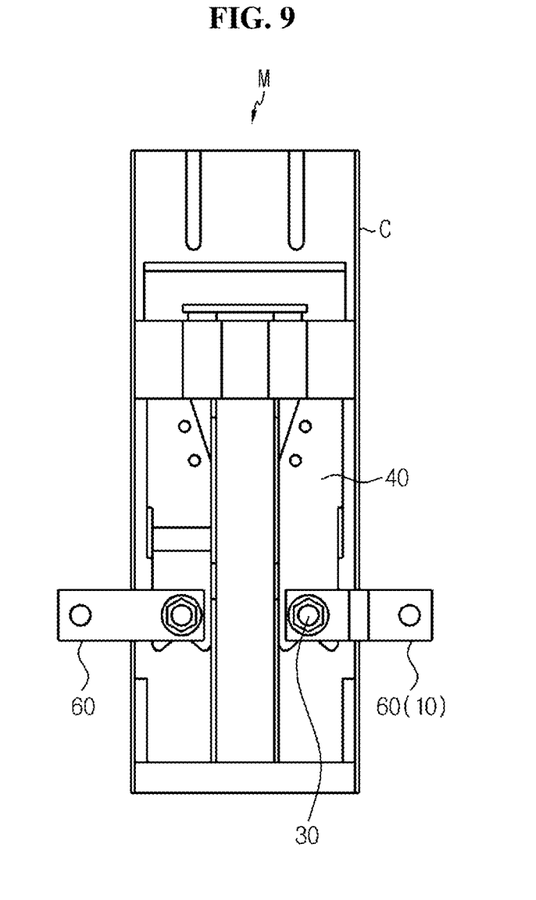

FIGS. 8 and 9 are plane views illustrating a battery module according to an exemplary embodiment of the present disclosure.

Referring to FIGS. 8 and 9, the battery module M according to an exemplary embodiment of the present disclosure includes at least one battery cell (not shown), a module case C receiving the battery cell, an external terminal provided protrusively out of the module case C, and a bus bar 40 connecting the battery cell and the external terminal 30.

The connecting elements 10 and 20 for the secondary battery according to the present disclosure are applied to at least one of connecting elements installed on a path of an electric current flowing in the battery module M.

That is, the connecting elements 10 and 20 may be applied as, for example, the bus bar 40 (see FIG. 8) installed in the battery module M.

Also, the battery module M may further include a lead terminal 60 connected to the external terminal 30, and the connecting elements 10 and 20 may be also applied as the lead terminal 60.

Subsequently, a battery pack P according to an exemplary embodiment of the present disclosure is described with reference to FIGS. 10 through 12.

Figure 10:
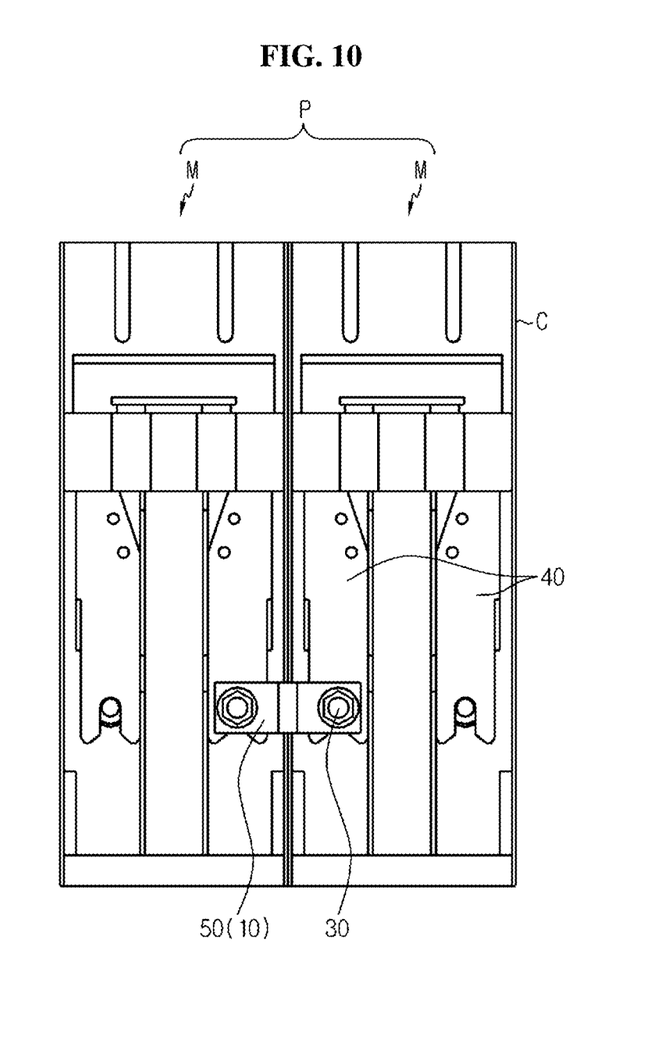
FIGS. 10 through 12 are plane views illustrating a battery pack according to an exemplary embodiment of the present disclosure.
Figure 11:
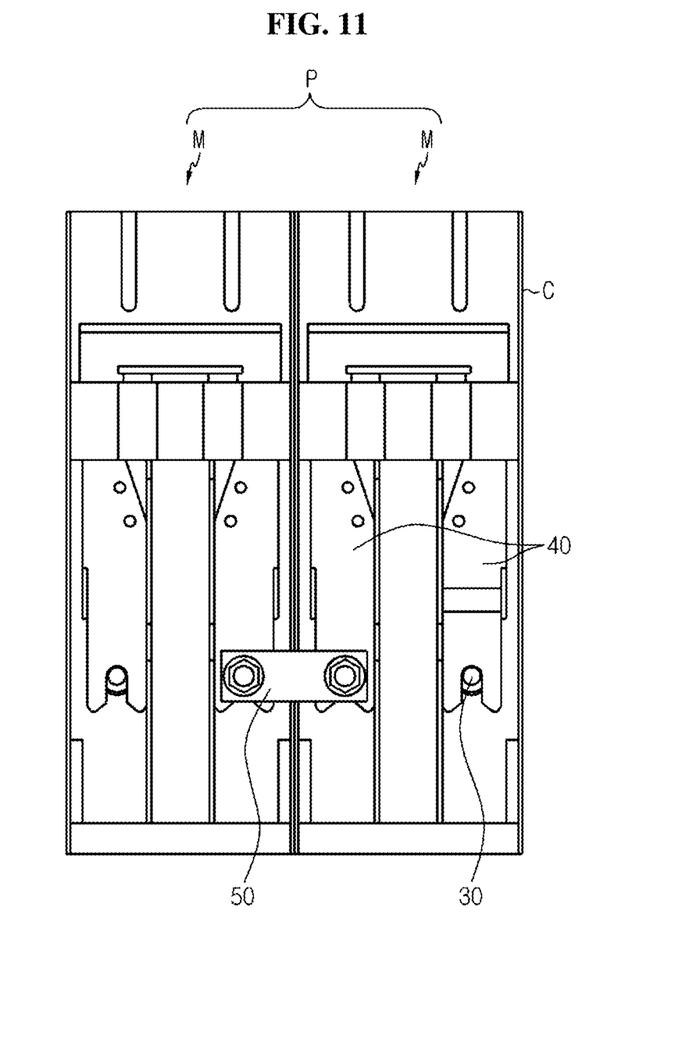
Figure 12:
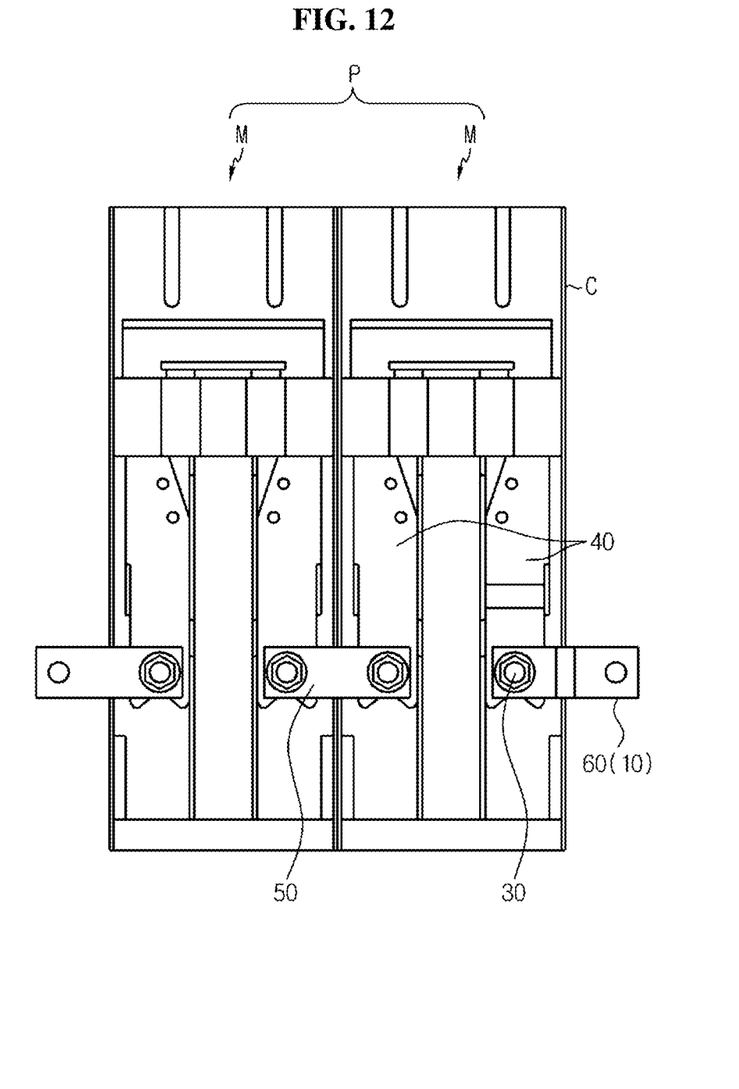

FIGS. 10 through 12 are plane views illustrating a battery pack according to an exemplary embodiment of the present disclosure.

Referring to FIGS. 10 through 12, the battery pack P according to an exemplary embodiment of the present disclosure is implemented by connecting a plurality of battery modules M previously described, and the adjacent battery modules M may be connected by an interconnecting bar 50. That is, the interconnecting bar 50 may electrically connect the battery modules by, for example, connecting the external terminals of each of the adjacent battery modules M.

The battery pack P has a structure in which the connecting elements 10 and 20 for the secondary battery according to the present disclosure are applied to at least one of connecting elements installed on a path of an electric current flowing in the battery pack P, similar to the battery module M previously described.

That is, the connecting elements 10 and 20 may be applied as, for example, the bus bar 40 and/or the interconnecting bar 50 and/or the lead terminal 60 equipped in the battery pack P.

As described in the foregoing, the battery module M and the battery pack P according to the present disclosure has a structure in which the connecting elements 10 and 20 according to the present disclosure are applied to the connecting element installed on the path of electric current, thereby interrupting an overcurrent quickly and safely.

Hereinabove, the present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A connecting element for a secondary battery, comprising:
   a metal plate having a recess groove;
   a soldering pattern having a lower melting point than the metal plate and formed within the recess groove; and
   an insulation layer covering an area where the soldering pattern is formed,
   wherein the insulation layer is formed within the recess groove.

2. The connecting element for the secondary battery according to claim 1, wherein the recess groove is formed along a widthwise direction of the metal plate.

3. The connecting element for the secondary battery according to claim 1, wherein the soldering pattern is made from a lead-free soldering material containing tin (Sn) and copper (Cu) without lead (Pb).

4. The connecting element for the secondary battery according to claim 3, wherein a content of the tin is in a range of 65.0 wt % to 99.9 wt %, and a content of the copper is in a range of 0.01 wt % to 35.0 wt %.

5. The connecting element for the secondary battery according to claim 4, wherein when the content of the tin and the content of the copper together amount to less than 100 wt % of the soldering material, the soldering pattern is made from the soldering material further including at least one additional metal selected from a group consisting of Nickel (Ni), zinc (Zn), and silver (Ag).

6. The connecting element for the secondary battery according to claim 5, wherein a content of the additional metal is in a range of 0.01 wt % to 20.0 wt %.

7. The connecting element for the secondary battery according to claim 1, wherein the soldering pattern is made from a soldering material having a melting point from 100° C. to 250° C.

8. The connecting element for the secondary battery according to claim 1, wherein an upper surface of the metal plate and an upper surface of the insulation layer form a same plane.

9. The connecting element for the secondary battery according to claim 1, wherein the insulation layer is made from at least one material selected from a group consisting of insulating materials including ceramic and reinforced resin.

10. A battery module comprising:
    at least one battery cell, a module case receiving the battery cell, an external terminal provided protrusively out of the module case, and a bus bar connecting the battery cell and the external terminal,
    wherein the connecting element according to claim 1 is applied as a connecting element installed on a path of an electric current flowing in the battery module.

11. The battery module according to claim 10, wherein the connecting element is applied as the bus bar.

12. The battery module according to claim 10, further comprising:
    a lead terminal connected to the external terminal,
    wherein the connecting element is applied as the lead terminal.

13. A battery pack implemented by connecting a plurality of battery modules, each battery module comprising at least one battery cell, a module case receiving the battery cell, an external terminal provided protrusively out of the module case, and a bus bar connecting the battery cell and the external terminal,
    wherein the connecting element according to claim 1 is applied as a connecting element installed on a path of an electric current flowing in the battery pack.

14. The battery pack according to claim 13, further comprising:
    an interconnecting bar connecting the adjacent battery modules,
    wherein the connecting element is applied as the interconnecting bar.

15. The battery pack according to claim 13, wherein the connecting element is applied as the bus bar.

16. The battery pack according to claim 13, further comprising:
    a lead terminal connected to the external terminal of the battery pack,
    wherein the connecting element is applied as the lead terminal.

17. A connecting element for a secondary battery, comprising:
    a metal plate having a recess groove;
    a soldering pattern having a lower melting point than the metal plate and formed within the recess groove; and
    an insulation layer covering an area where the soldering pattern is formed,
    wherein an upper surface of the metal plate and an upper surface of the insulation layer form a same plane.

18. The connecting element for the secondary battery according to claim 17, wherein the insulation layer is formed within the recess groove.

19. A battery module comprising:
    at least one battery cell, a module case receiving the battery cell, an external terminal provided protrusively out of the module case, and a bus bar connecting the battery cell and the external terminal,
    wherein the connecting element according to claim 17 is applied as a connecting element installed on a path of an electric current flowing in the battery module.

20. A battery pack implemented by connecting a plurality of battery modules, each battery module comprising at least one battery cell, a module case receiving the battery cell, an external terminal provided protrusively out of the module case, and a bus bar connecting the battery cell and the external terminal,
    wherein the connecting element according to claim 17 is applied as a connecting element installed on a path of an electric current flowing in the battery pack.

* * * * *